(12) United States Patent
Ortwein et al.

(10) Patent No.: US 8,819,560 B2
(45) Date of Patent: Aug. 26, 2014

(54) DISPATCHING EVENTS TO MULTIPLE BROWSER WINDOWS/TABS USING A SINGLE CONNECTION

(75) Inventors: Andrew M. Ortwein, Lexington, KY (US); William M. Quinn, Lexington, KY (US); Christopher A. Hyland, Foxboro, MA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 12/185,237

(22) Filed: Aug. 4, 2008

(65) Prior Publication Data

US 2010/0031153 A1    Feb. 4, 2010

(51) Int. Cl.
    *G06F 3/033*    (2013.01)
(52) U.S. Cl.
    USPC .......................... 715/733; 715/207; 715/804
(58) Field of Classification Search
    USPC .......................................... 715/207, 733, 804
    See application file for complete search history.

(56) References Cited

U.S. PATENT DOCUMENTS

| | | | | |
|---|---|---|---|---|
| 5,289,574 | A * | 2/1994 | Sawyer | 715/759 |
| 5,600,776 | A * | 2/1997 | Johnson et al. | 715/733 |
| 5,726,669 | A | 3/1998 | Obata et al. | |
| 5,754,830 | A * | 5/1998 | Butts et al. | 719/311 |
| 5,761,661 | A * | 6/1998 | Coussens et al. | 705/26.1 |
| 5,764,230 | A * | 6/1998 | Baradel et al. | 715/804 |
| 5,844,553 | A * | 12/1998 | Hao et al. | 715/733 |
| 6,166,732 | A * | 12/2000 | Mitchell et al. | 715/733 |
| 6,177,932 | B1 * | 1/2001 | Galdes et al. | 715/733 |
| 6,182,073 | B1 * | 1/2001 | Kukkal | 1/1 |
| 6,664,978 | B1 * | 12/2003 | Kekic et al. | 715/733 |
| 6,788,315 | B1 * | 9/2004 | Kekic et al. | 715/733 |
| 7,055,097 | B1 | 5/2006 | Netsch | |
| 7,389,284 | B1 * | 6/2008 | Surlaker et al. | 707/714 |
| 7,610,351 | B1 * | 10/2009 | Gollapudi et al. | 709/217 |
| 7,707,513 | B2 * | 4/2010 | Broda et al. | 715/804 |
| 7,996,766 | B2 * | 8/2011 | Chiang | 715/238 |

OTHER PUBLICATIONS

Ferraiolo et al., Communications Hub TF Minutes Apr. 26, 2007, http://www.openajax.org/member/wiki/Communications_Hub_TF_Minutes_Apr. 26, 2007.
Direct Web Remoting, http://getahead.org/dwr/changelog/dwr20.
Davis, David, Inter Window Communication With JavaScript, http://xantus.vox.com/library/post/inter-window-communication-with-javascript.html.

* cited by examiner

*Primary Examiner* — Amy Ng
*Assistant Examiner* — Meseker Takele
(74) *Attorney, Agent, or Firm* — David A. Dagg

(57) ABSTRACT

An initial browser window establishes itself as a "master" window for an associated server. A master window "cookie" data structure is created by the master window to share state among the windows for the server. Through the initially created master window cookie, all subsequently created browser windows detect that a master window is currently active, determine the master window's window name, and then establish themselves as slave windows through the master window. Slave windows call into the master window to request server updates/events, and provide the master window with their respective window names for future reference, e.g. when the master window distributes updates/events received from the server to the slave windows. The master window uses only a single HTTP GET command to fetch and dispatch updates/events associated with itself and all slave windows for the server.

24 Claims, 3 Drawing Sheets

DISPATCHING EVENTS TO MULTIPLE BROWSER WINDOWS/TABS USING A SINGLE CONNECTION

FIELD OF THE INVENTION

The invention relates generally to asynchronous, real-time communications between server and client components in Web applications, and more specifically to a system and method to dispatch AJAX/Web2.0 events to multiple browser windows/tabs using a single HTTP (HyperText Transfer Protocol) connection.

BACKGROUND OF THE INVENTION

As it is generally known, the World Wide Web (referred to as the "Web" herein) is a system for providing interlinked hypertext documents via the Internet. Through a Web browser executing on a local client computer system, a user can view Web pages obtained from remote server computer systems. Web pages commonly include a mark-up language such as HTML (HyperText Markup Language) or the like, and may contain various specific types of content, including text, images, videos, and other multimedia.

A Web application is an application that is accessed over a network by a user on a client computer system via a Web browser. AJAX (Asynchronous JavaScript and XML), refers to a group of inter-related Web development techniques used to create interactive Web applications. In order to increase responsiveness and interactivity of a Web page, AJAX operates by exchanging relatively small amounts of data between the client and server such that the Web page does not have to be reloaded each time there is a need to fetch data from the server. As a result, the Web page's interactivity, speed, functionality and usability are increased.

Web 2.0 is a broad term describing the growing use of various Web technologies to enhance creativity, information sharing, and collaboration among users. Web 2.0 related efforts have led to the development of Web-based communities and hosted services, such as social-networking Web sites, wikis, blogs, and folksonomies. Significantly, many Web 2.0 Web sites rely heavily on AJAX.

Modern AJAX/Web 2.0 applications often need the server to asynchronously send real-time events to clients. For example, an AJAX-based chat session requires the server to relay the chat text received by the server to multiple connected clients. Existing systems have employed an HTTP (HyperText Transfer Protocol) server to send messages to clients. In some existing systems, a client makes an HTTP GET request to the server, and the server keeps the request until an event is ready for the client. The server then responds to the client with the event. This type of "polling" enables clients to obtain asynchronous events. However, Web browsers that are compliant with HTTP 1.1 are restricted to having at most two HTTP connections to any given server. Dedicating one of the two permitted connections for a server to getting asynchronous events leaves only one HTTP connection for everything else. This may be acceptable in situations in which only one browser window is needed for a service/application provided by the server, but imposes limitations that may be problematic in many cases.

For example, a problem may arise when it is desired that a single client (e.g. a user's client computer system) have several browser windows or tabs open to a given server. The need to have several windows/tabs open at once may arise in various use cases, such as when a window/tab is needed for each of multiple chat sessions provided simultaneously through a server, each of multiple online meetings provided simultaneously through a server, etc. In existing systems, N different windows/tabs using the same server (e.g. chat server, meeting server, etc.) must somehow share one of the two HTTP connections allowed by the browser to the server. This is a significant problem, and there is currently no way for existing systems to share a single HTTP connection among multiple windows/tabs associated with a single server.

Several solutions have been attempted, but have fallen significantly short in one way or another. For example, non-HTTP approaches, such as direct sockets/protocols to the server, e.g. using an applet software component, or Adobe Flash multimedia technologies, have been used. However, the custom ports and protocols involved in such systems are often problematic, especially with regard to issues related to the use of typical firewalls and/or proxies.

Another previously attempted solution involved each window separately polling for its own updates. However, this approach is likely to create too much load on the server, even though most of the time no updates would be obtained.

In another previous technique, a single physical server is referred to by many different names (e.g. through wildcard DNS or defined subdomains), so that each request appears from the browser's point of view to go to a different server. This type of approach involves a difficult set up for administrators, and may not work on all networks. In addition, cross-domain issues associated with this type of operation that are considered to be a security risk, and accordingly it may not always work in future browsers.

Other existing systems have made low-level changes to browser settings in order to increase the number of connections allowed in the browser. This approach is also difficult, since it requires users to install some amount of digitally signed, trusted code, and must be done for each and every browser and the operating system.

In view of the various shortcomings of such previous solutions as described above, there accordingly remains a significant need for a simpler and better way of getting asynchronous updates from a single, specific server to multiple browser windows/tabs of a browser on a client.

SUMMARY OF THE INVENTION

To address the above described and other shortcomings of existing systems, a system and method are disclosed for dispatching events (e.g. AJAX/Web 2.0 events) to multiple browser windows/tabs using a single HTTP connection. In the disclosed system, an initial window establishes itself as a "master" window for an associated server. The presence of the master window then prevents subsequent browser windows associated with the same server from using the remaining connection available in the browser for that server. The disclosed system creates a master window "cookie" data structure within the browser to share state between the master window and one or more slave windows for the server.

When a browser window is created, a determination is made as to whether a master window currently exists for the server providing the service/application displayed to the user through the window. The determination may, for example, be based on whether a master window cookie currently exists for the server. If a master window cookie does not currently exist for the server, the newly created window becomes the master window for the server, creates a master window cookie, and associates its window name with the master window cookie. When another instance of a window is subsequently created for the server, that new window finds the previously created master window cookie, and thus determines that a master window already exists. By this mechanism, through the initially created master window cookie, all subsequently created window instances detect that a master window is currently active at the time of their creation. Such subsequently created windows also determine the master window's window name through the master window cookie, and establish themselves as slave windows through the master window.

Using the master window name obtained from the master window cookie, slave windows identify the single master window for the server, and call into the master window, requesting updates/events from the server through the master window. Slave windows also provide the master window with their respective window names for future reference, e.g. when the master window distributes updates/events received from the server to the appropriate slave windows. When the master window is closed, it passes "mastership" to one of the existing slave windows, using a list of slave window names it maintains.

The disclosed system addresses the shortcomings of previous systems by operating such that the master window uses only a single HTTP GET command, and accordingly only a single HTTP connection, to fetch and dispatch updates/events associated with itself and all slave windows for the server. Thus the present system advantageously uses a locally created and stored master window cookie to maintain master/slave window state, share window names, and perform message dispatching. Since only one HTTP connection is used to get updates for all combined windows of the server, the disclosed system ensures that updates remain fast and efficient. Moreover, window to window communication in the disclosed system is fast, and requires no additional HTTP connections to a server. No direct socket and/or protocol, custom network configuration, and/or custom browser settings are required.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
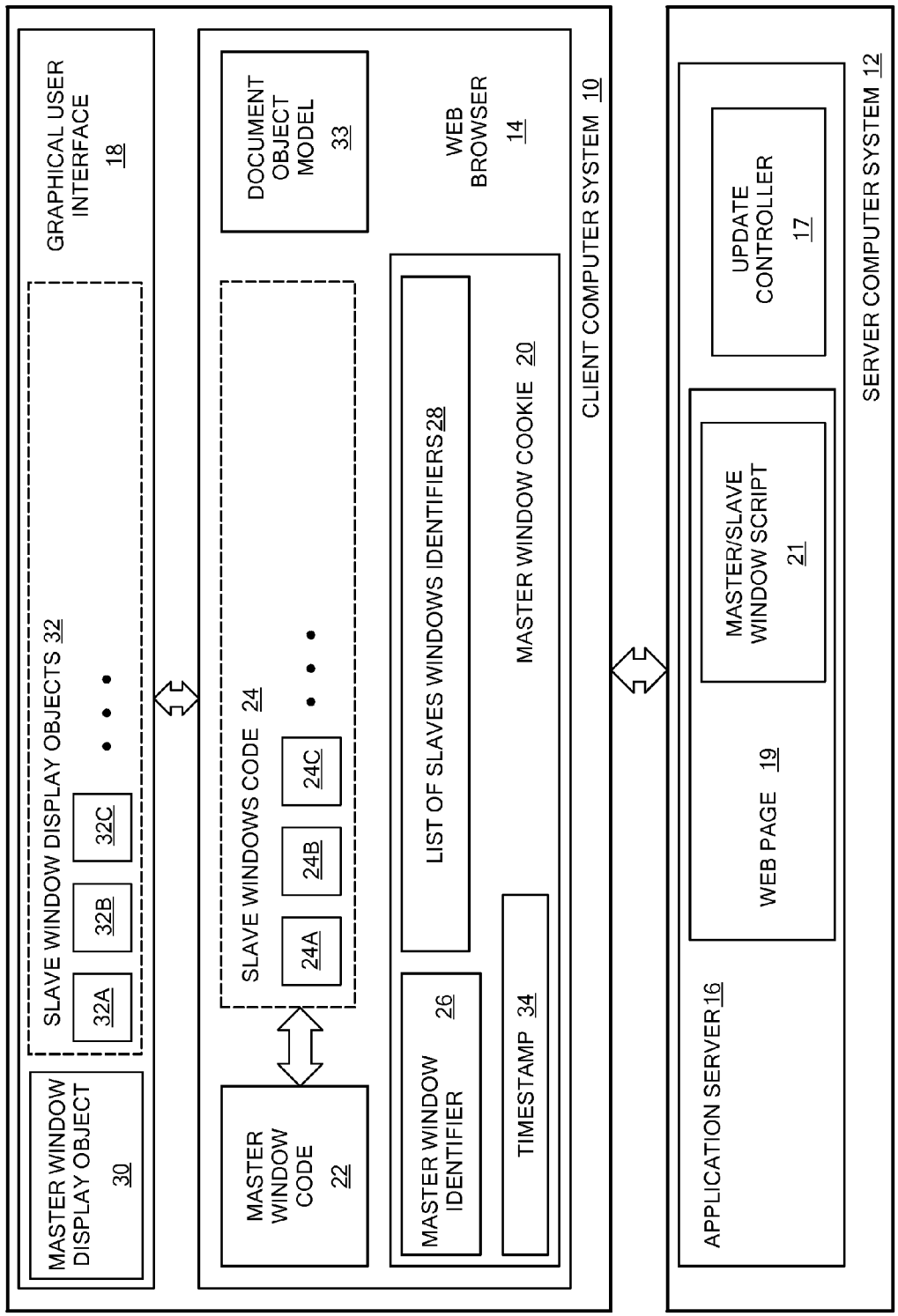
FIG. 1 is a block diagram showing components in an illustrative embodiment of the disclosed system.

As shown in FIG. 1, an illustrative embodiment of the disclosed system includes a Client Computer System 10 communicably connected to a Server Computer System 12. The Client Computer System 10 includes a Web Browser 14, and the Server Computer System 12 includes an Application Server 16. The Web Browser 14 is a software application that enables a user of the Client Computer System 10 to display and interact with content within Web pages provided from remote server systems such as the Server computer System 12. The Application Server 16 is a software engine that delivers one or more applications to client computers or devices, such as the Client Computer System 10, using HTTP.

The Web Browser 14 generates a Graphical User Interface 18, and includes a Master Window Cookie 20, Master Window Code 22, Slave Windows Code 24 (e.g. Slave Window Code 24a, Slave Window Code 24b, Slave Window Code 24c, etc.), and Document Object Model 33. The Master Window Code 22 generates and corresponds to a Master Window Display Object 30 displayed in the Graphical User Interface 18, and each of the Slave Windows Code 24 generates and corresponds to one of the Slave Window Display Objects 32 (e.g. Slave Window Display Object 32a, Slave Window Display Object 32b, Slave Window Display Object 32c, etc.) also displayed in the Graphical User Interface 18. The Master Window Cookie 20 is shown in the illustrative embodiment of FIG. 1 including a Master Window Identifier 26, a List of Slave Window Identifiers 28, and a Timestamp 34. In an alternative embodiment, only the Master Window Identifier 26 is included in the Master Window Cookie 20.

During operation of the components of the illustrative embodiment of FIG. 1, and as further described below, when Web pages are loaded from the Application Server 16 (e.g. Web Page 19) to the Web Browser 14, Master/Slave Window Script within each page is run (e.g. Master/Slave Window Script 21), and the Master Window Code 22, Slave Windows Code 24, and Master Window Cookie 20 are created. The Master Window Code 22 operates to fetch updates from the Application Server 16 for the Master Window Display Object 30 and all of the Slave Window Display Objects 32 using a single HTTP connection, by issuing a single HTTP command (e.g. HTTP GET) to the Update Controller 17 (e.g. using an address of or pointer to the Update Controller 17, such as a Uniform Resource Locater ("URL")). When new update information is received from the Application Server 16, the Master Window Code 22 distributes the received updates among the Slave Windows Code 24.

The Client System 10 of FIG. 1 may be any specific type of computer system and/or intelligent electronic device, such as a desktop, laptop, or palmtop computer system, and/or personal digital assistant, cell phone, or other electronic device. The Client System 10 includes or controls display devices capable of displaying a graphical user interface (e.g. including Graphical User Interface 18) to a respective local user, such as a liquid crystal display (LCD), cathode ray tube (CRT), interferometric modulator display (IMOD), light emitting diode (LED), or the like.

Those skilled in the art will further recognize that the Web Browser 14 and Application Server 16 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Client System 10 and Server System 12 of FIG. 1 may each include one or more processors, and program storage, such as memory, for storing program code executable on such processors, as well as input/output devices and/or interfaces. In the example of FIG. 1, the Client System 10 and Server System 12 are interconnected by a data communication network (e.g. the Internet, a Local Area Network, etc.) through one or more of such input/output devices or interfaces, and through which may further be provided communication to a number of other client systems and/or remote server systems.

While for purposes of concise illustration a limited number of client and server systems are shown in FIG. 1, the disclosed system is not limited to any specific number of client or server systems.

Figure 2:
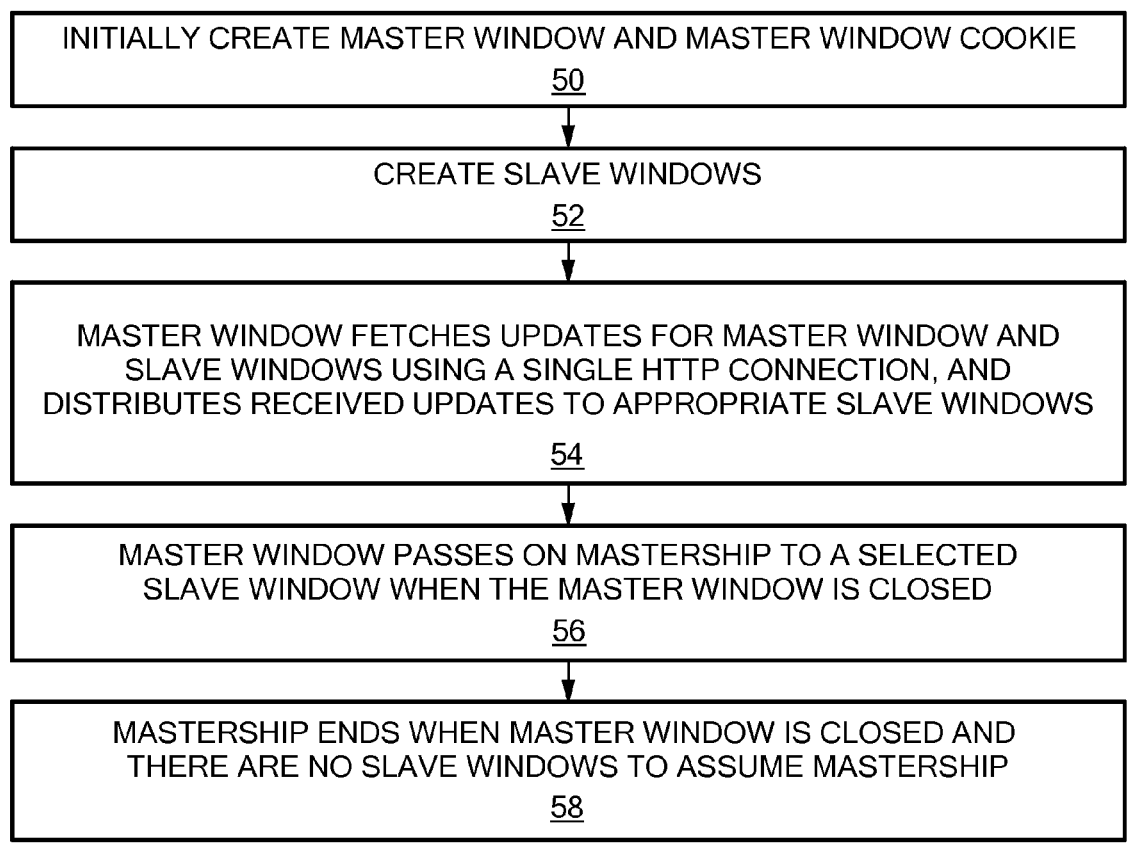
FIG. 2 is a flow chart showing steps performed during operation of an illustrative embodiment of the disclosed system.

FIG. 2 is a flow chart showing steps performed during operation of an illustrative embodiment of the disclosed system. As shown in FIG. 2, at step 50, the disclosed system initially creates a Master Window and a Master Window Cookie to form a basis for local window-to-window communication within windows of a browser executing on a client system. Specifically, on a single client computer (e.g. Client Computer System 10 in FIG. 1) a Web browser (e.g. Web Browser 14) may have multiple windows and/or tabs open simultaneously. For example, a typical scenario would be to have one browser window open to an online chat room, another browser window open to view today's headlines from a news Web site, and a third browser window open to check an electronic mail ("e-mail") account. Moreover, a user may have multiple browser windows simultaneously open for a service or application provided by a single server (e.g. Application Server 16). For example, the user may simultaneously have multiple browser windows open to simultaneously participate in multiple chat sessions provided by a single instant messaging server.

The disclosed system takes advantage of the fact that browser windows can communicate with each other if they know each other's window names. Though previous browsers did not conveniently maintain a global list of windows, the disclosed system includes a mechanism for tracking the names of all open windows providing a service or application from the same server by creating a browser cookie (e.g. Master Window Cookie 20 of FIG. 1) that stores the window names of all open windows (e.g. in List of Slave Window Identifiers 28 in FIG. 1) providing a service or application from a given server. In one embodiment, the window names used by the disclosed system are the same as the identifiers used to identify the corresponding windows in the Document Object Model 33 shown in FIG. 1.

The master window cookie of the disclosed system is special type of browser cookie (sometimes referred to herein as a "cookie", and also known as an "HTTP cookie" or "Web cookie"). The master window cookie stores information, related to a specific Web page or pages, and is stored on the client computer system's hard drive. Browser windows can retrieve the master window cookie at run time, and read data from and/or write data to the master window cookie. For example, when a user first visits a Web site, and as further described below, a master window cookie may be created on the hard drive of the user's client computer system for that Web site. The next time the user navigates the browser to the same Web site, the browser automatically locates the previously created master window cookie.

More specifically, in the disclosed system, when a Web page (e.g. Web Page 19 in FIG. 1) is loaded into a new browser window, JavaScript code (e.g. Master/Slave Window Script 21) from the Web page is executed. The JavaScript code on the Web page attempts to retrieve a master window cookie for the server (e.g. for Application Server 16). If no master window cookie exists, then the JavaScript code determines that the new browser window being created for the Web page is the first instance of a window for the server, and that browser window becomes the "master" window for the server. The JavaScript also creates the master window cookie (e.g. Master Window Cookie 20). In one embodiment, the value of the master window cookie is set to the window name of the master window.

Subsequently, at step 52, one or more slave windows are created that also provide the service or application from the server (e.g. Application Server 16) associated with the master window and master window cookie created at step 50. For example, when a second or subsequent Web page is loaded from the server into a new window (or tab), the newly loaded Web page will also need to obtain events from the server. Like the initial Web page loaded in step 50, the newly loaded Web page has JavaScript (like Master/Slave Window script 21) that looks for a master window cookie associated with the server the client computer system's hard drive. Unlike at step 50, Web pages loaded at step 52 find the existing master window cookie created at step 50, and therefore know that a master window already exists for the server from which the service or application is provided. Further at step 52, the JavaScript code reads the master window cookie to find the window name of the master window for that server. After the window name of the master window cookie has been obtained, the JavaScript code obtains a reference to the master window (e.g. as a JavaScript object) by, for example, in one embodiment, by using JavaScript's window.open( ) call. It will be recognized by those skilled in the art that such use of the "open" method is itself somewhat unconventional, since the disclosed system is not using the "open" method to open a window, but instead is using the call in order to obtain a reference to the previously opened master window. Accordingly, in this way, by using the window name of the master window and making the window.open( ) call, the slave window of the disclosed system calls directly into the master window, in order to communicate to the master window that the slave window has been created. Each time the master window learns of another slave window, it adds that window to a list of slave windows (e.g. List of Slave Window Identifiers 28 in FIG. 1) that is only available to JavaScript in the master window (e.g. Master Window Code 22). As more windows open that provide the application or service of the associated server, their window identifiers are added to the master window's list of slave windows, and accordingly the list of slave windows increases in size. Conversely, the opposite process is followed as slave windows are closed. For example, when a slave window is closed, the slave window's JavaScript code (e.g. one of Slave Windows Code 24) calls back to the master window code (e.g. Master Window Code 22) and unregisters the slave window from the master window, causing the master window code to remove that slave window's window identifier from the master window's list of slave identifiers. Using the list of slave window identifiers created in step 52, the master window can communicate directly with each of the slave windows for the associated server.

Subsequent to step 52, the JavaScript code in the master window (e.g. Master Window Code 22) can invoke JavaScript code on the slave windows (e.g. Slave Windows Code 24). The master window can then at step 54 assume the responsibility of making AJAX requests or the like to the server on behalf of each of the slave windows. In the disclosed system, any AJAX request that a slave window makes (e.g. fetching the latest messages in a chat room), is only made by the master window. In this way, the disclosed system uses only one HTTP connection for all of the open windows that are pointing to the same server.

In the disclosed system, when the master window receives a response from the server, the master window automatically determines which of the windows associated with the server (e.g. Master Window Code 22 or one of Save Windows Code 24) the response belongs to. For example, the server associated with the master and slave windows may be an instant messaging (or "chat") session server. In such an example, the master window may provide a first chatroom to the local user (chatroom "A"), while one of the slave windows for the server may provide a second chatroom (chatroom "B"). Accordingly, when a response is received from the chat server, the received response may be intended for the master window (chatroom "A"), or the slave window for the second chatroom (chatroom "B"). In order to allow the master window to distinguish between windows associated with the chat server, the chat server must identify the intended target window with each response it sends.

Because the master window of the disclosed system maintains its own window name and the window names of all slave windows for the associated server, the master window can communicate useful window-specific context information in each request it makes to the server. Such window-specific context information may, for example, include identifiers of the master window and all slave windows for the server on the client system. In this way, the master window sends a request message to the server (e.g. to a URL of Update Controller 17 in FIG. 1) indicating that the server should provide the master window with any updates related to any of the windows identified in the request. When the server receives request, the server operates to determine if any updates are available for any of the windows identified in the request. When an update becomes available for one of the identified windows, the server sets a value on the update identifying the specific context uniquely identifying the specific window on the client system to which the update belongs, before sending the update (potentially together with other updates as well) in a response to the master window. As a result, when a response is received by the master window from the server, the JavaScript code in the master window iterates through the response, and uses the context information received with each update in the response to identify the appropriate target window to which each update should be delivered (either the master window itself or one of the slave windows for the server). The server may not be explicitly aware of the multiple windows on the client system, but instead simply respond only to requests received from the master window, while ensuring that sufficient context information is associated with each update such that the JavaScript in the master window can associate the update with, and route the update to the correct window.

In step 56, the master window passes on mastership to a selected slave window when the master window is closed. For example, a user may have three different windows open to the remote server, where each window is for a different chatroom topic hosted on the remote server. In particular, the window for chatroom "A" is the master window, and the windows for chatroom B and chatroom C are slave windows. At any given time, the user may decide to no longer participate in chatroom A, and accordingly close the master window. However, since the master window is the only window communicating with the chat server from the client computer system, the disclosed system operates to detect the closing of the master window, and takes actions to designate a new master window from one of the existing slave windows so that the update events do not stop flowing to window B and window C. So, we need a way for one of the remaining slave windows to become the master window.

As described above, operation of the disclosed system establishes a way for JavaScript associated with one window to call JavaScript associated with another window. Accordingly, when the JavaScript code in the current master window (e.g. chatroom A) detects that the master window is being closed, it selects a first slave (e.g. chatroom B) as a candidate to be the new master window. The master then sends the candidate window the list of all the window names of the slave windows for the associated server (e.g. List of Slave Window Identifiers 28 in FIG. 1), but excluding the window name of the candidate window. When the JavaScript code in the candidate window (i.e. slave window for chatroom B) is invoked, the receipt of the slave window identifier list signals that the candidate window is to now take on the role of being a master window. At this point, the candidate window writes its window name to the master window cookie, which allows new windows to identify it as the new master window. The candidate window is now the new master window, and has the ability to communicate with each of the existing slave windows for the server, just as the original master window did.

Once communication between the new master window and all of the remaining slaves has been established, the former master window is allowed to close. The new master window communicates with the server to receive updates, and distributes the updates it receives to itself or any of the slave windows for the server as indicated by the context of each received update.

At step 58, mastership for a server ends when the master window for the server is closed and there are no slave windows to assume mastership. When a master window is closing, and there are no slave windows to pass mastership on to, the master window first deletes the master window cookie containing the master window's name before it is completely closed. This ensures that the next time a browser window is opened for the remote server, that new browser window will detect the absence of any existing master window for the server and accordingly become a new master.

Occasionally, the browser process can be interrupted, causing windows to close suddenly and without notice. Examples of such a scenario include when the client computer system suddenly loses power, and when the browser "crashes" because of an error in the operating system. One side effect from this scenario is that any master window that existed when the browser process terminated will not execute the instructions it normally executes while closing. In other words, the closing master window will not delete the master window cookie when the browser process is terminated unexpectedly.

To address this situation, the master window cookie of the disclosed system is set to expire when the browser process is closed, for example by setting an "expires" property of the cookie or the like to a special (e.g. negative) value. This is done when the master window cookie is first created, and ensures that the cookie will not exist after the browser process has been terminated and started again.

Another scenario addressed by the disclosed system occurs when the browser purposely maintains state at the moment of a crash. For example, the Firefox 2.0 browser has a feature that allows a user to restore the previous browser in the event of a browser crash. This includes keeping cookies present when the browser crashed, with the result that there could be a master window cookie present in a browser that was kept from a pre-crash browser instance, and that may not point to a valid master window, since the master window may also have disappeared during the crash.

To solve this potential problem the disclosed system makes use of a timestamp (e.g. Timestamp 34 shown in FIG. 1) within the master window cookie. The disclosed system maintains the value of the timestamp in the master window cookie as the time that the most recent response from the server was received by the master window. In the event of a browser crash and the user subsequently restarting the browser and also choosing to restore the previous browser session, the first Web page from the server that is loaded having JavaScript code that checks for a master window cookie for the server will check the value of the timestamp in the master window cookie. Based on the timestamp value, the JavaScript in the Web page can determine that, despite the presence of a master window cookie, the last response receipt time indicated by the timestamp is prior to time the browser was restarted, and accordingly the master window cookie is in fact invalid. The JavaScript code can then delete the invalid master window cookie and create a new one, thus establishing itself as the new master window.

Figure 3:
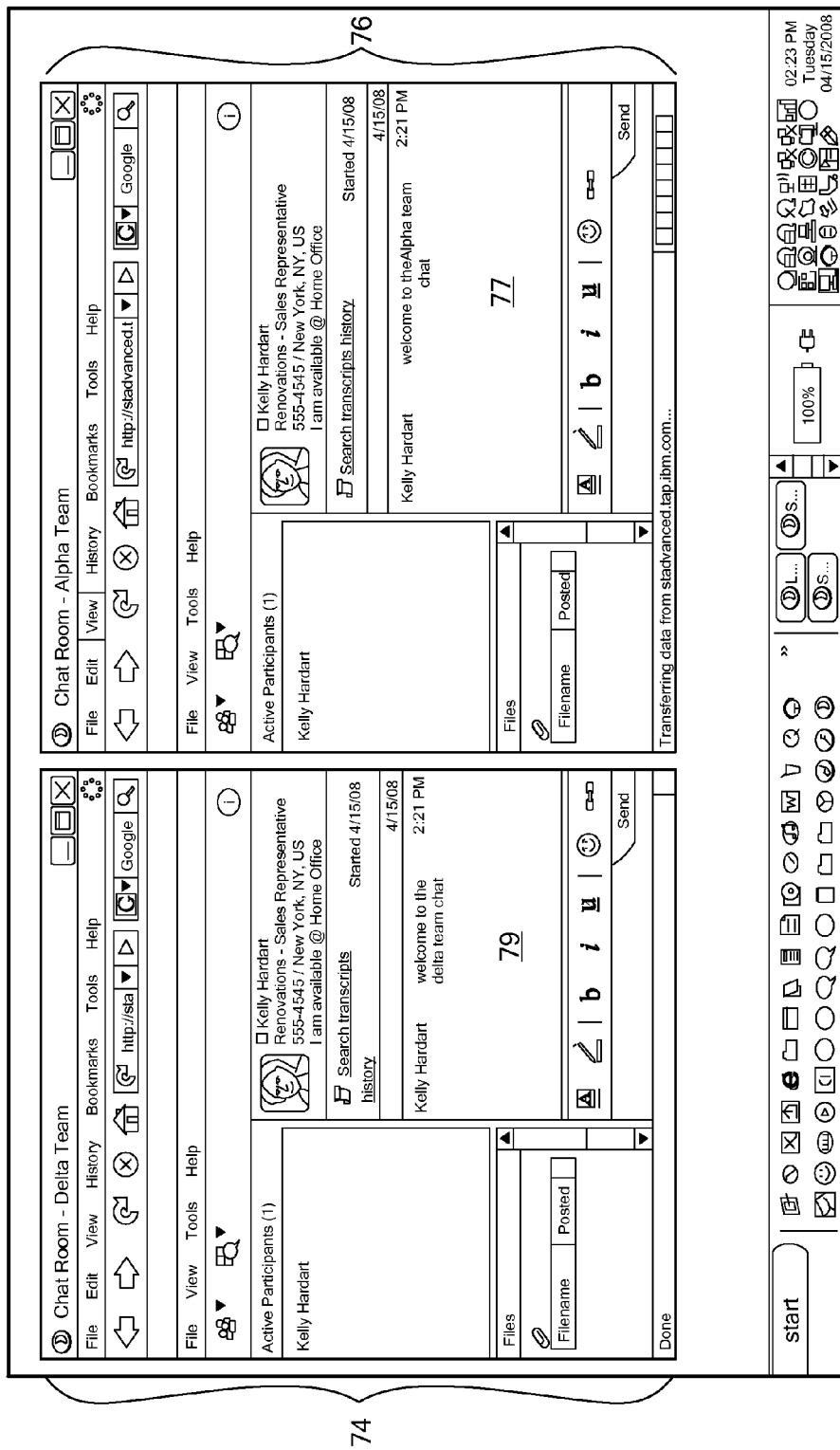
FIG. 3 is simplified screen shot showing an example of a portion of a user interface created during operation of an illustrative embodiment of the disclosed system.

FIG. 3 is simplified screen shot showing an example of a portion of a user interface created during operation of an illustrative embodiment of the disclosed system. As shown in FIG. 3, a first browser window 76 in the graphical user interface 72 provides a first chat room (instant messaging session) 77 to a local user, while a second browser window 74 provides a second chat room (instant messaging session) 79 to the local user. For example, the first browser window 76 may be the display object for the master window associated with the remote chat server that provides both chat room 77 and chat room 79 to the local user, and the second browser window 74 may be the display object for a slave window associated with the same remote chat server.

Although only two browser windows are shown for purposes of illustration in FIG. 3, it will be recognized that the disclosed system is not limited to any specific number of simultaneously opened browser windows. Moreover, while FIG. 3 shows an example in which separate browser windows are used, the disclosed system is similarly applicable to separate tabs provided in a tabbed user interface. Accordingly, the terms "master window" and "slave windows" as used herein are intended to also refer in the alternative to a master tab and slave tabs respectively within a tabbed user interface.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:
1. A method comprising:
    determining, at least in part by executing program code contained within a first Web page on a client system in response to loading said first Web page from a remote server into a first new browser window of a Web browser executing on said client system, whether a master window has previously been opened for said remote server, at least in part by attempting to retrieve a master window cookie containing identifiers for all open windows providing a service from said remote server;
    in response to determining that no master window cookie has previously been opened for said remote server, creating, within said Web browser executing on said client computer system, a master window associated with a remote server, said master window comprising said first new browser window, wherein said creating said master window includes creating a master window cookie for said remote server and storing an identifier of said master window into a name of said master window cookie within a memory of said client computer system;
    determining, at least in part by executing program code contained within a second Web page on said client system in response to loading said second Web page from said remote server into a second new browser window of said Web browser executing on said client system, that a master window containing identifiers for all open windows providing a service from said remote server has previously been opened, at least in part by retrieving said master window cookie for said remote server;
    in response to said retrieving said master window cookie for said remote server, creating, within said Web browser executing on said client computer system, a slave window associated with said remote server, said slave window comprising said second new browser window, wherein said creating said at least one slave window includes identifying said master window using said identifier of said master window stored in said name of said master window cookie, using said identifier of said master window to obtain a reference to said master window by calling a window open method on a master window object corresponding to the previously opened master window, and registering said slave window with said master window to receive updates; and
    issuing, by said master window, a single request to said remote server to obtain, by said master window, all available updates from said remote server for both said master window and said slave window.
2. The method of claim 1, further comprising:
    wherein said single request is an HTTP GET request.

3. The method of claim 1, further comprising:
wherein said master window is a single tab within a tabbed user interface generated by said Web browser.

4. The method of claim 1, further comprising:
wherein said slave window is a tab within a tabbed user interface generated by said Web browser.

5. The method of claim 1, further comprising:
wherein said master window and said slave window are separate windows of said Web browser.

6. The method of claim 1, further comprising:
storing a name of said slave window in said master window cookie.

7. The method of claim 6, wherein said name of said slave window further identifies said slave window for said remote server in a document object model maintained by said Web browser.

8. The method of claim 6, further comprising:
distributing, by said master window to said slave window, updates for said slave window received from said remote server responsive at least in part to said name of said slave window stored in said master window cookie.

9. The method of claim 8, further comprising:
responsive to detecting that said master window is being closed, determining a new master window, wherein said new master window is said slave window.

10. The method of claim 8, further comprising:
wherein said at least one slave window comprises a plurality of slave windows; and
responsive to detecting that said master window is being closed, determining a new master window, wherein said new master window is an oldest one of said plurality of slave windows.

11. The method of claim 1, further comprising:
responsive to detecting that said master window is being closed, determining that no slave window associated with said remote server exists; and
responsive to said determining that no slave window associated with said remote server exists, deleting said master window cookie.

12. A system including at least one processor and a non-transient computer readable memory storing program code executable on said at least one processor, said program code comprising:
program code for determining, at least in part by executing program code contained within a first Web page on a client system in response to loading said first Web page from a remote server into a first new browser window of a Web browser executing on said client system, whether a master window has previously been opened for said remote server, at least in part by attempting to retrieve a master window cookie containing identifiers for all open windows providing a service from said remote server;
program code for, in response to determining that no master window cookie has previously been opened for said remote server, creating, within said Web browser executing on said client computer system, a master window associated with a remote server, said master window comprising said first new browser window, wherein said creating said master window includes creating a master window cookie for said remote server and storing an identifier of said master window into a name of said master window cookie within a memory of said client computer system;
program code for determining, at least in part by executing program code contained within a second Web page on said client system in response to loading said second Web page from said remote server into a second new browser window of said Web browser executing on said client system, that a master window containing identifiers for all open windows providing a service from said remote server has previously been opened, at least in part by retrieving said master window cookie for said remote server;
program code for, in response to said retrieving said master window cookie for said remote server, creating, within said Web browser executing on said client computer system, a slave window associated with said remote server, said slave window comprising said second new browser window, wherein said creating said at least one slave window includes identifying said master window using said identifier of said master window stored in said name of said master window cookie, using said identifier of said master window to obtain a reference to said master window by calling a window open method on a master window object corresponding to the previously opened master window, and registering each slave window for said remote server with said master window for said remote server to receive updates; and
wherein said master window issues a single request to said remote server to obtain, by said master window, all available updates from said remote server for both said master window and said slave window.

13. A computer program product comprising:
a non-transitory computer readable medium; and
program code stored on said non-transitory computer readable medium for distributing events to multiple windows by
determining, at least in part by executing program code contained within a first Web page on a client system in response to loading said first Web page from a remote server into a first new browser window of a Web browser executing on said client ystem, whether a master window has previously been opened for said remote server, at least in part by attempting to retrieve a master window cookie containing identifiers for all open windows providing a service from said remote server;
in response to determining that no master window cookie has previously been opened for said remote server, creating, within said Web browser executing on said client computer system, a master window associated with a remote server, said master window comprising said first new browser window, wherein said creating said master window includes creating a master window cookie for said remote server and storing an identifier of said master window into a name of said master window cookie within a memory of said client computer system;
determining, at least in part by executing program code contained within a second Web page on said client system in response to loading said second Web page from said remote server into a second new browser window of said Web browser executing on said client system, that a master window containing identifiers for all open windows providing a service from said remote server has previously been opened, at least in part by retrieving said master window cookie for said remote server;
in response to said retrieving said master window cookie for said remote server, creating, within said Web browser executing on said client computer system, a slave window associated with said remote server, said slave window comprising said second browser window, wherein said creating said at least one slave window includes identifying said master window using said identifier of said master window stored in said name of said master window cookie data, using said identifier of said master window to obtain a reference to said master window by calling a window open method on a master window object corresponding to the previously opened master window, and registering said slave window with said master window for said remote server to receive updates; and issuing, by said master window, a single request to said remote server to obtain, by said master window, all available updates from said remote server for both said master window and said slave window.

14. The system of claim 12, wherein said single request is an HTTP GET request.

15. The system of claim 12, wherein said master window is a single tab within a tabbed user interface generated by said Web browser.

16. The system of claim 12, wherein said slave window is a tab within a tabbed user interface generated by said Web browser.

17. The system of claim 12, wherein said master window and said slave window are separate windows of said Web browser.

18. The system of claim 12, said program code for creating said slave window further stores a name of said slave window in said master window cookie data structure.

19. The system of claim 12, wherein said program code for creating said master window stores only a name of said master window in said master window cookie data structure.

20. The system of claim 19, wherein said name of said slave window further identifies said slave window for said remote server in a document object model maintained by said Web browser.

21. The system of claim 19, further comprising:
program code for distributing, by said master window to said slave window, updates for said slave window received from said remote server responsive at least in part to said name of said slave window stored in said master window cookie data structure.

22. The system of claim 20, further comprising:
program code for, responsive to detecting that said master window is being closed, determining a new master window, wherein said new master window is said slave window.

23. The system of claim 20, further comprising:
wherein said at least one slave window comprises a plurality of slave windows; and
program code for, responsive to detecting that said master window is being closed, determining a new master window, wherein said new master window is an oldest one of said plurality of slave windows.

24. The system of claim 12, further comprising:
program code for, responsive to detecting that said master window is being closed, determining that no slave window associated with said remote server exists; and
program code for, responsive to said determining that no slave window associated with said remote server exists, deleting said master window cookie.

* * * * *